(No Model.)
S. L. WIEGAND.
METHOD OF AND APPARATUS FOR ELECTRIC WELDING.
No. 456,541. Patented July 21, 1891.
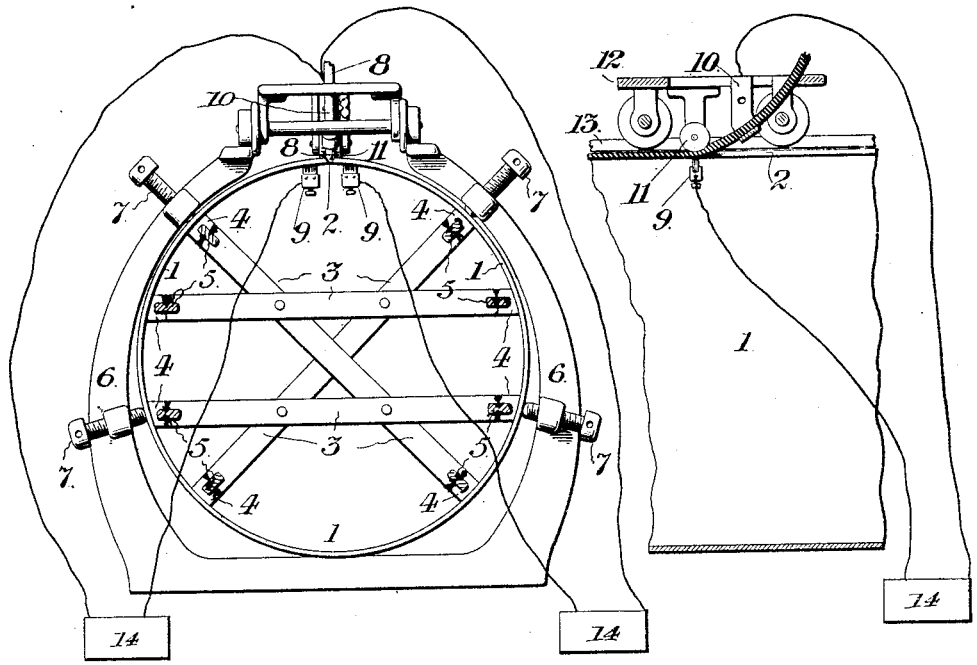
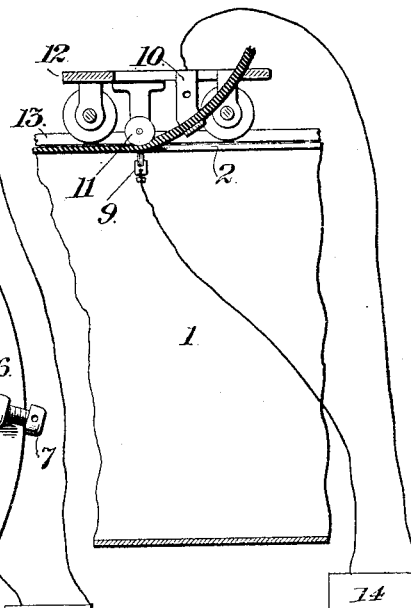
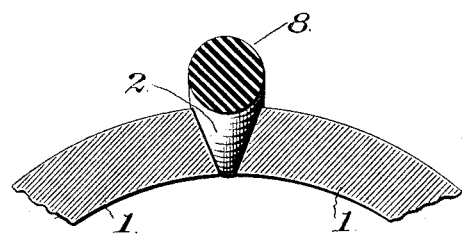
WITNESSES:
INVENTOR:

UNITED STATES PATENT OFFICE.

S. LLOYD WIEGAND, OF PHILADELPHIA, PENNSYLVANIA.

METHOD OF AND APPARATUS FOR ELECTRIC WELDING.

SPECIFICATION forming part of Letters Patent No. 456,541, dated July 21, 1891.

Application filed December 9, 1889. Serial No. 333,099. (No model.)

*To all whom it may concern:*

Be it known that I, S. LLOYD WIEGAND, a citizen of the United States, residing at Philadelphia, in the county of Philadelphia and State of Pennsylvania, have invented certain new and useful Improvements in Methods of and Apparatus for Welding Parts of Structural Metal Work; and I do hereby declare the following to be a sufficiently full, clear, and exact description thereof as to enable others skilled in the art to make and use the said invention.

This invention relates to the welding of pieces of metal together of such forms and dimensions that the union of the entire surfaces involved in the weld cannot be effected simultaneously, but must be made progressively.

The invention has for its object the confining of the electric circuit to parts of the seam, the avoidance of the expense usually incurred in machine-dressing the surfaces to be welded, and the convenient union of the parts involved in the weld without encountering obstruction from local expansion or the springing of the parts.

The nature of this invention to effect these desiderata consists in the introduction of a fillet or strip of metal between the parts and in connecting such strip or fillet so that the current and intense heat resulting therefrom may be concentrated upon a short portion in the seam, and to so heat the fillet of metal as to render it plastic and thus afford an easy means of enforcing intimate contact in the surfaces involved in the welding. In undergoing a change in form the fillet is kneaded into complete union with the plate metal. The method of and apparatus for performing this operation are illustrated in the accompanying drawings, in which—

Figure 1 shows an end elevation of a cylinder in process of welding in the lengthwise seam; Fig. 2, a vertical lengthwise section of the same, and Fig. 3 an enlarged section of the parts involved in the weld.

The same reference-marks indicate like parts in the several figures.

1 represents a sheet of plate metal bent to form a cylindrical ring or rim, the edges of which are preferably cut obliquely to the plane of the sheet, so as to present a converging space or cleft 2 where they are brought opposite each other by the bending operation.

The sheet of metal is held in form by a series of internal frames or spiders 3, having blocks 4 and wedges 5, by which they may be tightened and clamped externally by frames 6, having set-screws 7 arranged to press upon the plate 1 and thus hold it securely, with the beveled edges of the lengthwise seam at a slight distance from each other, with the cleft 2 between them. A strip of metal (marked 8,) having beveled or curved sides, is laid with one end in the end of the cleft. Suitable fluxes are applied to the fillet 8, and the sides of the cleft and clamps 9 are electrically connected to the plate 1 on both sides of the cleft, near the edges thereof, each edge with a similar pole or electrode of a separate and distinct electric transforming-instrument 14, so that when the opposite electrodes of the transforming-instruments are electrically connected by a clamp 10 to the fillet 8 the electric circuit from both transforming-instruments shall pass through the fillet 8 and the plate 1, dividing upon the sides to return the transforming-instruments. The passage of the current through the circuits thus described heats the end of the fillet and the parts of the plate 1 in contact therewith, so as to render them plastic and to unite in a welding of the fillet 8 and plate 1. During this operation the upper clamp 10 and lower clamps 9 are moved progressively along the seam as the welding proceeds and fillet is 8 is pressed into intimate contact and union with the plate 1 by an electrically-insulated hammer or roller 11, supported on and moving with a carriage 12, resting upon rails or guides 13, supported on the clamps 6. The fillet 8 being made with curved sides (a cylindric rod answering the purpose) undergoes a change of form and kneading when in a plastic or soft condition and unites more perfectly with the plates 1 than when made of the form of the gap between the plates and simply pressed into contact, and from its smaller dimension than the plates serves to confine the heating action of the electric current and concentrate it upon the parts immediately involved in the weld.

Having described this invention and the operation thereof, what I claim is—

1. The method of uniting parts of structural metal work by inserting progressively a fillet of metal of such small cross-section as to become pliable and plastic under temperature, and transmitting through such fillet two or more distinct electrical currents which divide and pass through the separate surfaces opposed to the fillet and applying pressure to the fillet to insure contact, as set forth.

2. The method of uniting parts of structural plate-work by first preparing the parts and holding them in juxtaposition with open converging clefts between them, next inserting the end of a metallic fillet of sufficient cross-section to fill the cleft of such form as to undergo a flow or kneading of the metal in filling the cleft, next applying distinct electric generators or transformers to the parts contiguous to the points in contact with the fillet and connecting the opposite electrodes from both generators or transformers to the fillet, and finally pressing and kneading the fillet when heated into contact and union with the sides of the cleft, substantially as set forth.

3. In an apparatus for electrically welding large parts of metallic structures together, the combination of a clamping mechanism, substantially as described, for resisting the expansion and change of form during heating and application of pressure, with two similar electrodes arranged to electrically connect both parts involved in the seam with independent sources of electric current, a third electrical connection arranged to complete the circuits from the opposite electrodes of the electric generators to a fillet or strip inserted between the part involved in the weld, and the mechanism for progressively pressing said fillet into the seam and continuing the transmission of the electric current through said fillet and adjacent part during the progress of the heating and pressing operations, substantially as set forth and described.

S. LLOYD WIEGAND.

Witnesses:
F. C. LOWTHORP, Jr.,
J. DANIEL EBY.